(12) United States Patent
Sporrer et al.

(10) Patent No.: US 12,133,481 B2
(45) Date of Patent: Nov. 5, 2024

(54) STABILIZER CONTROL FOR AN AGRICULTURAL IMPLEMENT

(71) Applicant: Deere & Company, Moline, IL (US)

(72) Inventors: Adam D. Sporrer, Huxley, IA (US); Lucas B. Larsen, Ankeny, IA (US)

(73) Assignee: Deere & Company, Moline, IL (US)

( * ) Notice: Subject to any disclaimer, the term of this patent is extended or adjusted under 35 U.S.C. 154(b) by 636 days.

(21) Appl. No.: 15/841,471

(22) Filed: Dec. 14, 2017

(65) Prior Publication Data

US 2019/0183030 A1 Jun. 20, 2019

(51) Int. Cl.
*A01B 63/22* (2006.01)
*A01B 79/00* (2006.01)

(52) U.S. Cl.
CPC .............. *A01B 63/22* (2013.01); *A01B 79/00* (2013.01)

(58) Field of Classification Search
CPC ..... A01B 63/12; A01B 63/111; A01B 63/114; A01B 63/16; A01B 63/22; A01B 63/002; A01B 79/005; A01B 33/087; A01B 79/00
See application file for complete search history.

(56) References Cited

U.S. PATENT DOCUMENTS

| | | | | |
|---|---|---|---|---|
| 3,486,761 A * | 12/1969 | Fay | ........................ | A01B 63/32 280/43.23 |
| 4,821,806 A * | 4/1989 | Winter | ................... | A01B 63/22 172/4 |
| 4,967,851 A * | 11/1990 | Barber | ................... | A01B 63/22 280/43.23 |
| 5,957,218 A * | 9/1999 | Noonan | ................. | A01B 63/10 172/239 |
| 6,000,315 A * | 12/1999 | Graham et al. | ........ | F15B 15/24 91/520 |
| 6,129,157 A * | 10/2000 | Noonan | ................. | A01B 63/10 172/239 |
| 6,401,832 B1 * | 6/2002 | Payne | ..................... | A01B 63/22 172/238 |
| 6,698,523 B2 * | 3/2004 | Barber | ................... | A01B 63/22 172/239 |
| 6,971,453 B2 * | 12/2005 | Nordhoff | ........... | A01B 63/1006 172/7 |
| 7,478,683 B2 * | 1/2009 | Peck | ..................... | A01B 73/046 172/311 |
| 8,700,270 B2 * | 4/2014 | Foster et al. | ............. | G01L 5/16 701/50 |
| 9,516,796 B2 | 12/2016 | Sudbrink et al. | | |
| 9,609,799 B2 | 4/2017 | Henry | | |
| 9,661,798 B2 | 5/2017 | Sudbrink et al. | | |
| 9,961,823 B2 * | 5/2018 | Sporrer et al. | ......... | A01B 79/00 |
| 9,986,674 B2 * | 6/2018 | Sudbrink | ............... | A01B 63/22 |
| 10,225,983 B2 * | 3/2019 | Kovach | ............... | A01D 67/005 |
| 10,299,423 B2 * | 5/2019 | Sudbrink | ............... | A01B 73/02 |
| 10,405,480 B2 * | 9/2019 | Blunier | ................. | A01B 76/00 |

(Continued)

*Primary Examiner* — Thomas B Will
*Assistant Examiner* — Joel F. Mitchell
(74) *Attorney, Agent, or Firm* — Kelly, Holt & Christenson; Joseph R. Kelly

(57) ABSTRACT

A main depth control input is detected, that indicates a depth of a soil engaging implement. A corresponding position of a stabilizer depth control actuator is identified, and a control signal is generated to control a main depth control actuator based on the main depth setting detected, and to control a stabilizer depth control actuator based upon the corresponding position identified.

18 Claims, 12 Drawing Sheets

(56) References Cited

U.S. PATENT DOCUMENTS

| | | | |
|---|---|---|---|
| 10,645,856 B2* | 5/2020 | Stovall et al. | A01B 79/005 |
| 2004/0016556 A1* | 1/2004 | Barber | A01B 63/22 |
| | | | 172/452 |
| 2008/0110649 A1 | 5/2008 | Connell et al. | |
| 2017/0251588 A1* | 9/2017 | Sporrer et al. | A01B 79/00 |
| 2018/0220574 A1* | 8/2018 | Peterson | A01B 69/003 |
| 2018/0249622 A1* | 9/2018 | Sporrer | A01B 63/008 |
| 2018/0271020 A1* | 9/2018 | Kovach | A01D 67/005 |
| 2018/0310459 A1* | 11/2018 | Blunier | A01B 63/16 |
| 2018/0310460 A1* | 11/2018 | Stovall | A01B 63/22 |
| 2019/0000005 A1* | 1/2019 | Barrick | A01B 63/002 |
| 2019/0000006 A1* | 1/2019 | Blunier | A01B 63/002 |

* cited by examiner

STABILIZER CONTROL FOR AN AGRICULTURAL IMPLEMENT

FIELD OF THE DESCRIPTION

The present description relates to controlling stabilizer wheels on an agricultural implement. More specifically, the present description relates to controlling the position of stabilizer wheels, relative to an implement frame, and based on a depth control setting for the agricultural implement.

BACKGROUND

There are a variety of different types of agricultural implements that have stabilizer wheels. For instance, a tillage implement often has a main depth control system which includes a set of actuators coupled to weight bearing wheels. The position of the actuators controls a position of a frame of the tillage implement, relative to the weight bearing wheels. This, therefore, controls a depth of engagement of the tillage implement with the soil.

The main depth control actuators can be actuated to lift the entire implement out of the ground for travel, during headland turns within a field, etc. Therefore, the main control actuators have a relatively large range of movement so that they can move the weight bearing wheels, relative to the frame of the implement, from a first extreme position where the tillage implement is fully engaged (at maximum depth) with the soil, to a second extreme position where the tillage implement is raised so that it is completely out of engagement with the soil.

Stabilizer wheels are different from the weight bearing wheels in the main depth control system. Stabilizer wheels are often found on a certain portion of a tillage implement (such as on the front of the tillage implement) and are used to level the tillage implement when it is engaged with the soil. For instance, an operator may know that he or she will be tilling at a depth of 4 inches. The operator will then set a position of the stabilizer wheels, relative to the frame of the tillage implement, so that the tillage implement will be relatively level when tilling at a 4 inch depth.

In current systems, the position of the stabilizer wheels relative to the frame of the tillage implement is set by a mechanical turn buckle. Therefore, the operator adjusts the mechanical turn buckle so that the stabilizer wheels are at a desired position, relative to the frame of the tillage implement, and based on the operator's knowledge of the desired depth at which the operator will be tilling. By way of example, if the operator will be tilling at a 4 inch depth, then the stabilizer wheels may be set to a first position. However, if the operator is tilling at a 6 inch depth, the stabilizer wheels may be set to a second position.

Often, the stabilizer wheels are set before the operation begins, and are not adjusted until the operation is complete. This is because the stabilizer wheels are often adjusted by the mechanical turn buckle adjustment which requires the operator to exit the operator compartment and adjust the turn buckles to change the position of the stabilizer wheels relative to the frame of the tillage implement.

It should also be noted that stabilizer wheels, because they are used for leveling the tillage implement when it is engaged with the soil, often have a range of movement relative to the frame of the tillage implement that is less than the range of movement for the main depth control actuators. This is because the main depth control actuators need to be moved between the two extreme positions discussed above, while the stabilizer wheels only need to be moved through a narrower range of movement, to level the tillage implement when it is engaged in the soil.

The discussion above is merely provided for general background information and is not intended to be used as an aid in determining the scope of the claimed subject matter.

SUMMARY

A main depth control input is detected, that indicates a depth of a soil engaging implement. A corresponding position of a stabilizer depth control actuator is identified, and a control signal is generated to control a main depth control actuator based on the main depth setting detected, and to control a stabilizer depth control actuator based upon the corresponding position identified. This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
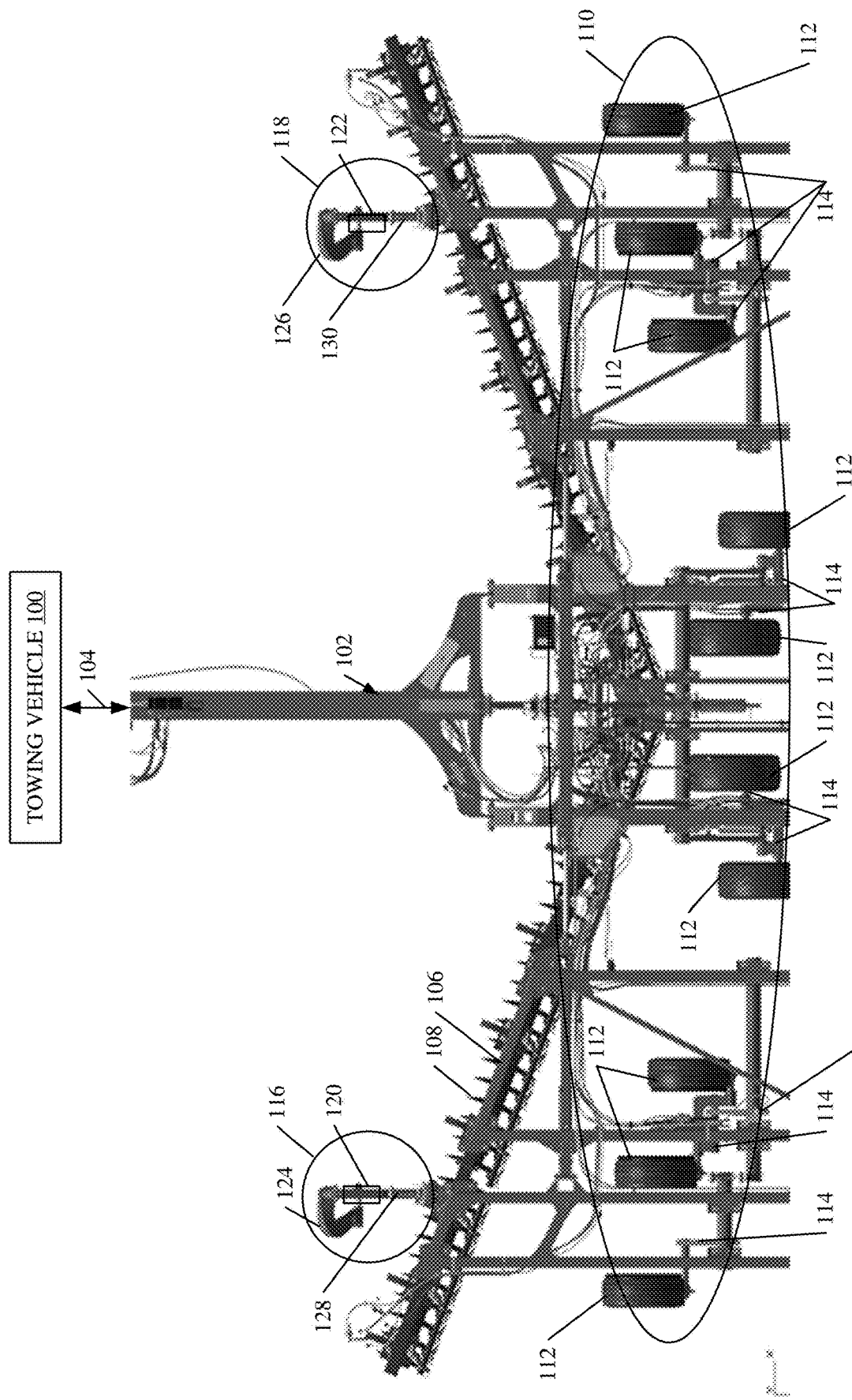
FIG. 1 is a partial block diagram, partial pictorial illustration, of one example of a tillage implement being towed by a towing vehicle.

FIG. 1 is a partial block diagram partial pictorial illustration of towing vehicle 100 towing a tillage implement 102. Towing vehicle 100 is illustratively coupled to implement 102 by link 104. Towing vehicle 100 can be, for instance, a tractor or another towing vehicle.

Implement 102 illustratively has a main frame 106 that supports a set of ground-engaging elements 108. The depth of engagement with the soil of ground-engaging elements 108 is controlled by a main depth control system generally illustrated at 110. Main depth control system 110 illustratively includes a set of main weight bearing wheels 112 that are coupled to main frame 108 through a set of movable linkages 114. Movement of the linkages 114 relative to frame 106 is illustratively driven by one or more different main depth control actuators (which may be hydraulic cylinders or other actuators). The cylinders can illustratively be actuated to raise or lower main frame 106 relative to wheels 112 and to thus change the depth of engagement of soil-engaging elements 108 with the soil over which implement 102 is traveling.

In addition, the main depth control actuators can move the relative position of wheels 112, relative to frame 106, between two extreme positions. The first extreme position is where wheels 112 are positioned so that they lift frame 106 high enough so that soil-engaging elements 108 are out of engagement with the ground. In one example, they can be raised several inches out of the ground so that implement 102 is positioned for travel to a different field, or to make headland turns in a field being tilled, etc. The second extreme position is where frame 106 is lowered relative to wheels 112 so that soil-engaging elements 108 are engaged at a maximum depth within the soil over which implement 102 is traveling. Thus, the main depth control actuators may be actuatable to move frame 108 through a range of vertical movement that is approximately 20 inches. This is just one example and the range of movement enabled by the main depth actuators can vary widely. FIG. 1 also shows that, in the example illustrated, implement 102 illustratively has a set of stabilizer wheel assemblies illustrated generally at 116 and 118. Stabilizer wheel assemblies 116 and 118 illustratively include stabilizer wheels 120 and 122, and a movable support assembly 124 and 126. Assemblies 124 and 126 support wheels 120 and 122, respectively, for movement relative to frame 106. The position of each of the movable assemblies is illustratively driven by a corresponding stabilizer depth control actuator (e.g., actuators 128 and 130, respectively). In one example, actuators 128 and 130 are illustratively hydraulic actuators.

Stabilizer wheels 120 and 122 are illustratively used to level implement 102 when it is in engagement with the ground. Therefore, the range of movement of the assemblies 124-126 and actuators 128-130 can move the position of stabilizer wheels 120-122 between two extreme positions. The two extreme positions, however, define a range of vertical movement of wheels 120-122, relative to frame 106, that is less than the range of movement of the main depth control wheels 112 relative to frame 106.

In one example, and as is described in greater detail below, actuators 128-130 can be independently actuated, independently of the main depth control actuators, and independently of one another. Also, in one example, once the operator sets a depth for the main depth control system 110, a control system can automatically identify a corresponding position of the stabilizer wheels 120-122, and can automatically control actuators 128-130 to move the stabilizer wheels to that position in order to level implement 102. Further, in one example, the operator can individually control cylinders 128-130 to level implement 102 based on the operator's observation. These scenarios are all described in greater detail below.

Figure 2:
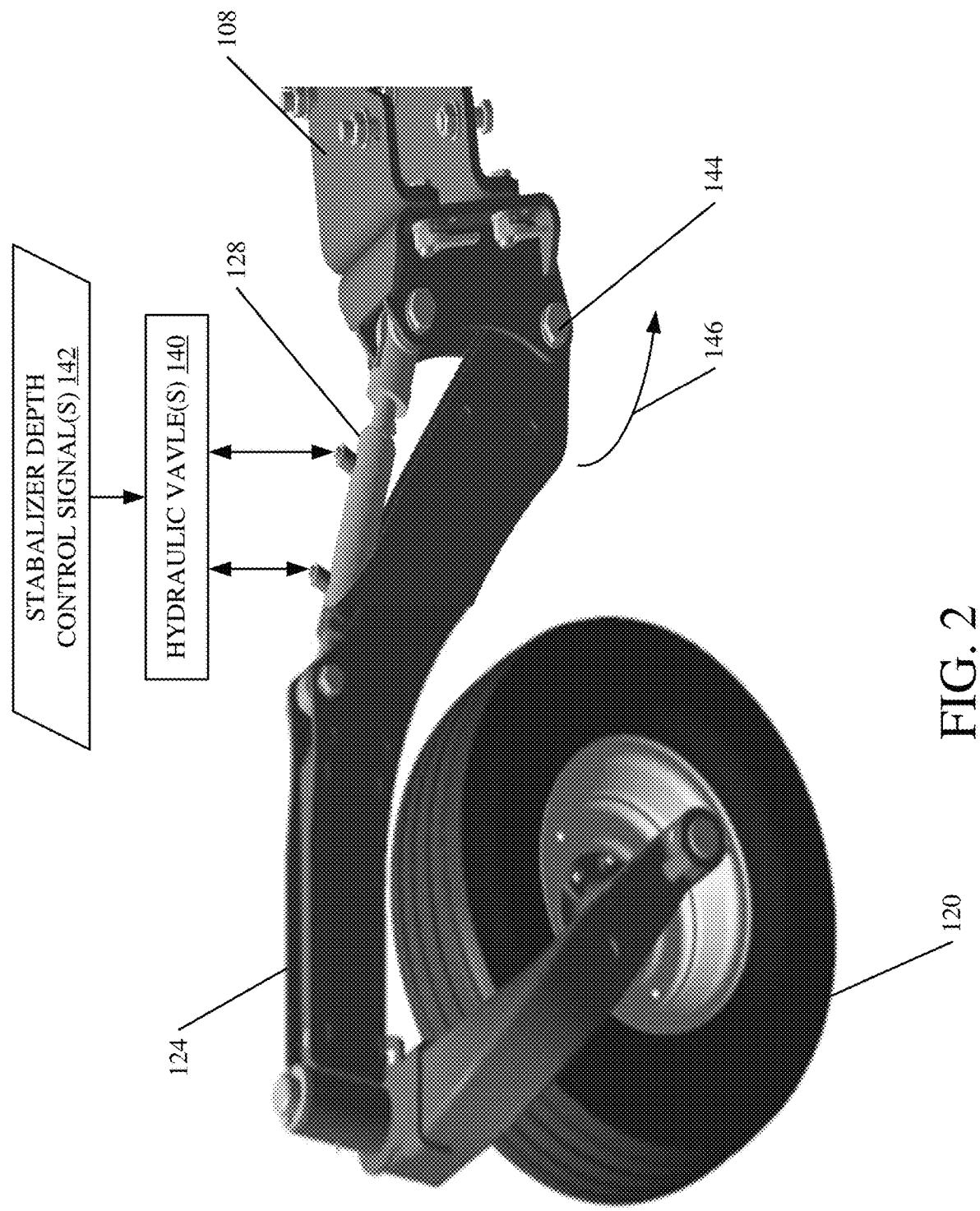
FIG. 2 is a pictorial illustration of one example of a stabilizer depth control actuator.

FIG. 2 is a pictorial illustration showing one example of a stabilizer wheel (stabilizer wheel 120), a portion of the movable support assembly (or linkage) 124, and the stabilizer depth control actuator 128. In the example illustrated, actuator 128 is illustratively a hydraulic cylinder that receives hydraulic fluid under pressure through one or more hydraulic valves 140. The hydraulic valves are illustratively controlled from a control system (which may be on towing vehicle 100 or on implement 102) that generates a set of stabilizer depth control signals 142. As hydraulic cylinder 128 is lengthened, this causes rotation of assembly 124 about pivot point 144 generally in the direction indicated by arrow 146. As cylinder 128 is shortened, it causes pivotal movement in the opposite direction. Thus, when assembly 124 is moved in the direction indicated by arrow 146, this causes stabilizer wheel 120 to move downwardly relative to the main frame 106, thus lifting a portion of main frame 106 relative to the soil over which implement 102 is traveling. When assembly 124 moves in the direction opposite of arrow 146, this causes wheel 120 to move upwardly relative to frame 106, to lower the frame relative to the ground.

Figure 3:
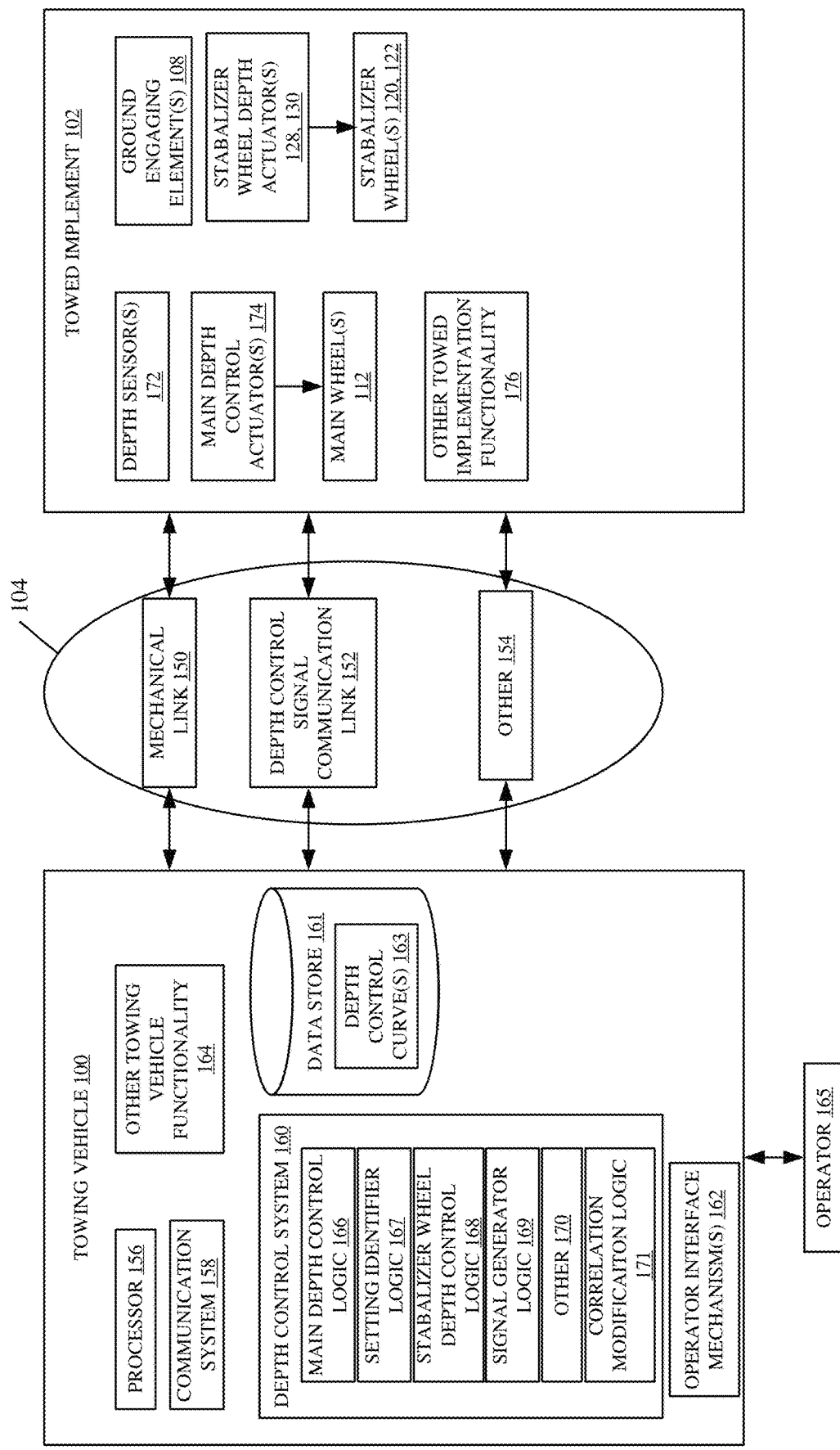
FIG. 3 is a block diagram showing one example of the towing vehicle and towed implement.

FIG. 3 is a block diagram showing one example of towing vehicle 100 and towed implement 102, in more detail. Some of the items in FIG. 3 are similar to those shown in previous FIGS. and they are similarly numbered. It can be seen in the example shown in FIG. 3 that towing vehicle 100 is connected to towed implement 102 by link 104. In the example shown in FIG. 3, towing vehicle 100 illustratively includes one or more processors 156, communication system 158, depth control system 160, data store 161, operator interface mechanisms 162, and other towing vehicle functionality 164. Depth control system 160, itself, can include main depth control logic 166, setting identifier logic 167, stabilizer wheel depth control logic 168, signal generator logic 169, correlation modification logic 171, and it can include other items 170. It will be noted that, for the sake of the present description, depth control system 160 is disposed on towing vehicle 100. However, it could be disposed on towed implement 102, and operator control inputs can be provided to the control system 160 on towed implement 102 through a suitable link 104. In addition, some portions of depth control system 160 can be disposed on towing vehicle 100 while other portions of it can be on towed implement 102. It is shown and described on towing vehicle 100 in the present description, for the sake of example only.

Towed implement 102 illustratively includes one or more depth or position sensors 172, ground-engaging elements 108, main depth control actuators 174, stabilizer wheel depth control actuators 128, 130, main wheels 112 and stabilizer wheels 120-122. Towed implement 102 can include a wide variety of other towed implement functionality 176, as well.

Link 104 can include a mechanical link 150, a depth control signal communication link 152, and it can include a wide variety of other links 154. Mechanical link 150 can include a mechanical connection between towing vehicle 100 and towed implement 102 so that vehicle 100 can tow implement 102. It can also include a hydraulic link, a power takeoff, or other mechanical links.

Depth control signal communication link 152 can include a wired or wireless connection that provides electrical signals (where the hydraulic control valves 140 are disposed on towed implement 102). Communication link 152 can also include a wired or wireless electrical link where the main depth control actuators and/or the stabilizer wheel depth control actuators are electrical actuators. It can include a wide variety of other links as well.

Before describing the overall operation of the items shown in FIG. 3, a brief overview of some of the components in FIG. 3, and their operation, will first be provided. Communication system 158 can illustratively be used to enable communication between towing vehicle 100 and towed implement 102, or to remote systems or vehicles as well. Therefore, communication system 158 can include a controller area network (CAN) bus, a near field communication system, a cellular communication system, or a wide variety of other communication systems, or combinations of systems.

Operator interface mechanisms 162 are illustratively mechanisms that are provided for interaction by operator 165. Operator 165 illustratively interacts with operator interface mechanisms 162 in order to control and manipulate towing vehicle 100, and towed implement 102. By way of example, operator interface mechanisms 162 can include levers, joysticks, steering wheels, pedals, mechanical linkages, user interface display devices, user actuatable display elements (such as links, icons, display buttons, etc.), a touch sensitive screen, a microphone and speech recognition system, a loud speaker, and/or other visual, audible, or haptic interface mechanisms.

Main depth control logic 166 illustratively receives an operator input from operator 165 setting a main depth control setting that can be used to generate control signals to control main depth control actuators 174 to set a position of main wheels 112 relative to frame 106. This establishes a main depth at which implement 102 will engage the soil over which implement 102 is traveling. Setting identifier logic 167 can also receive the main depth setting input by operator 165 and identify a corresponding position for stabilizer wheel depth control actuators 128, 130, based upon the main depth control setting. For instance, if operator 165 provides an input indicating that he or she wishes the main depth to be 4 inches, then setting identifier logic 167 illustratively identifies a corresponding position for stabilizer wheels 120, 122 relative to frame 106 so that implement 102 will be level, or at another desired orientation.

In one example, setting identifier logic 167 can access data store 161 and depth control curves 163. Depth control curves 163 can identify the stabilizer wheel depth or position based on a main depth control setting. Setting identifier logic 167 can identify the corresponding stabilizer wheel position in other ways as well. Main depth control logic 166 illustratively uses signal generator logic 169 to generate control signals to control the main depth control actuators 174 so that they position wheels 112 relative to frame 106 to obtain the main depth setting. Stabilizer wheel depth control logic 168 illustratively uses signal generator logic 169 to generate actuator control signals 142 (shown in FIG. 2) to control stabilizer wheel depth control actuators 128, 130 so that they set stabilizer wheels 120, 122 in the desired position relative to frame 106.

Figure 4A:
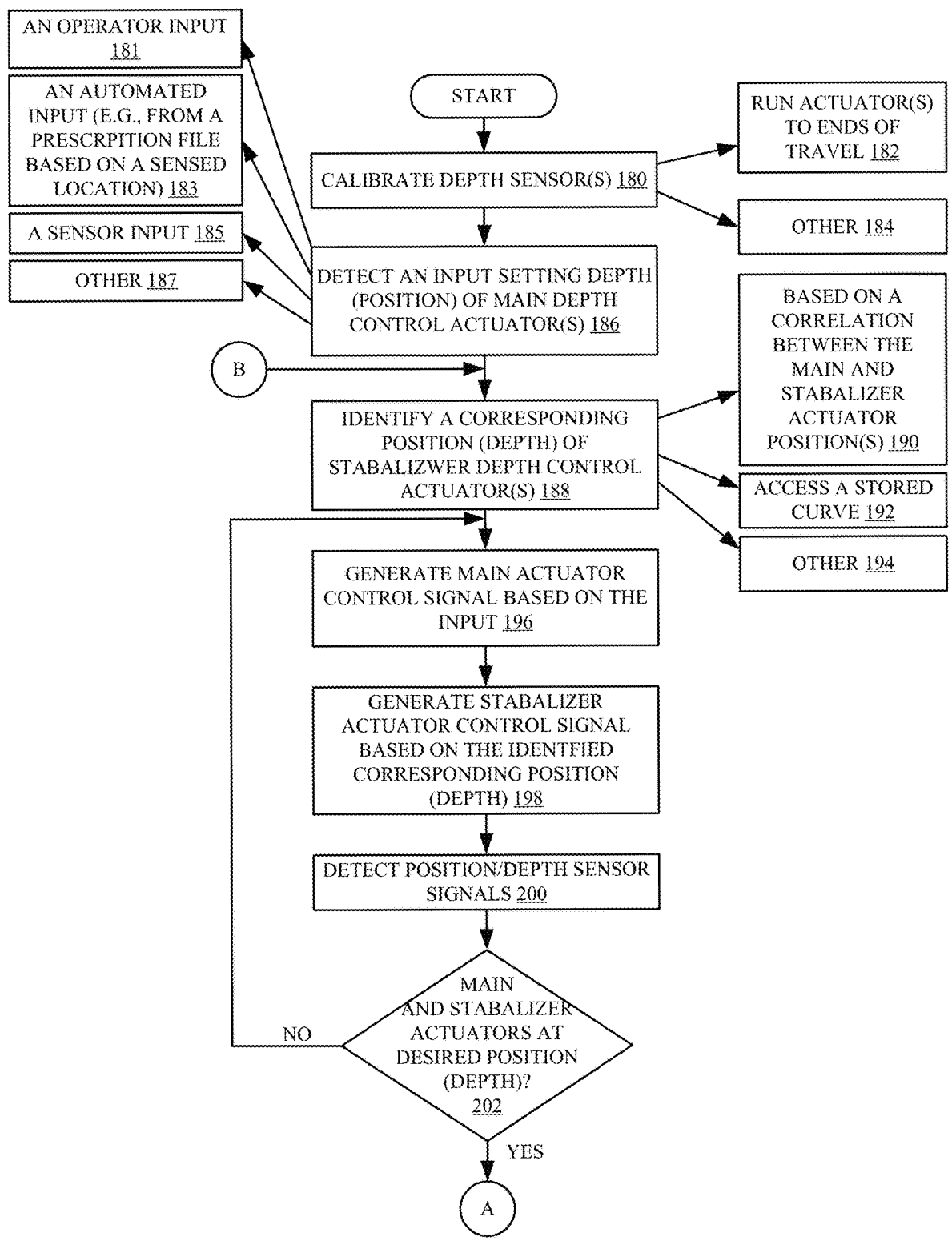
FIGS. 4A and 4B (collectively referred to herein as FIG. 4) illustrate a flow diagram showing one example of the operation of a depth control system.
Figure 4B:
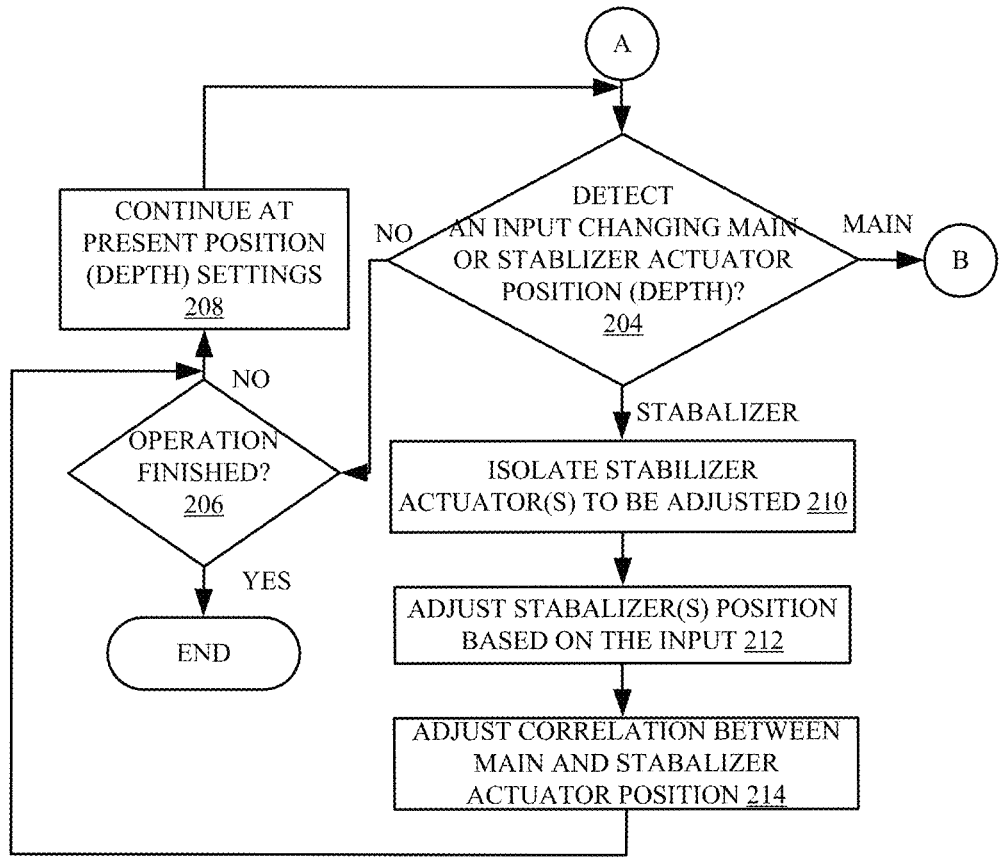

When operator 165 changes the main depth control setting, then the process can be repeated so that setting identifier logic 167 identifies a new corresponding position for the stabilizer wheel depth control actuators 128, 130, based upon the new main depth control setting. Also, it may be that operator 165 wishes to change the position of the stabilizer wheels, relative to frame 106, without changing the main depth setting, based upon observation or for other reasons. In that case, operator 165 illustratively provides operator inputs to stabilizer wheel depth control logic 168 to individually control the stabilizer wheel depth control actuators 128, 130, independently of the main depth control actuators 174. In one example, each of the stabilizer wheel depth control actuators 128, 130 can also be controlled independently of the other(s). These are examples only. FIGS. 4A and 4B (collectively referred to herein as FIG. 4) show a flow diagram illustrating one example of the operation of depth control system 160 in controlling the stabilizer wheel depth control actuators 128, 130 and main depth control actuators 174. In one example, depth control system 160 first calibrates the depth sensors 172 on towed implement 102. This is indicated by block 180 in the flow diagram of FIG. 4. For instance, it can run actuators 174 and 128, 130 to the end of their ranges of motion in one extreme position. It can then run them to the end of their ranges of motion in the other extreme position. The sensor signals can be detected at each extreme position to calibrate the sensors 172. This is indicated by block 182. The depth sensors can be calibrated in a wide variety of other ways as well, and this is indicated by block 184.

Depth control system 160 then detects a main depth setting input setting indicative of the depth or position of the main depth control actuators 174, to position the main weight bearing wheels 112 at a desired position relative to frame 108. This is indicated by block 186. The main depth setting input can be an operator input as indicated by block 181. It can be an automated input, such as an input obtained by accessing a prescription file that prescribes a depth setting based on a location in the field. Vehicle 100 or implement 102 may include a geographic location sensor (such as a GPS receiver), and the geographic location can be used to find a prescribed depth in the prescription file. This is indicated by block 183. The main depth setting can also be obtained based on a sensor signal from a sensor on implement 102 (or elsewhere) indicating that the main depth setting should be changed. This is indicated by block 185. The main depth setting can be obtained in other ways as well. This is indicated by block 187.

Once the main depth setting is received, setting identifier logic 167 illustratively identifies a corresponding position or depth that the stabilizer depth control actuators 128, 130, should be set to, based upon the main depth setting. This is indicated by block 188. The corresponding position or depth of the stabilizer depth control actuators is illustratively identified based upon a correlation between the main and stabilizer actuator positions. This is indicated by block 190. In one example, logic 167 identifies the corresponding position of the stabilizer depth control actuators 128, 130 by accessing one or more depth control curves 163 in data store 161. For any given main depth control setting, the depth control curves 163 illustratively output a stabilizer depth control actuator position corresponding to the main depth setting. Accessing a stored curve is indicated by block 192. It will be noted that setting identifier logic 167 can identify the stabilizer wheel control actuator position, based upon the main depth setting, in a wide variety of other ways as well, and this is indicated by block 194. Some of these are discussed in more detail below with respect to FIG. 5.

Main depth control logic 166 then controls the signal generator logic 169 to generate one or more main actuator control signals based upon the detected operator input. This is indicated by block 196. For instance, if the main depth control actuators 174 are electric actuators, then the control signals may be electric signals that are provided by communication system 158 to towed implement 102 to control actuators 174. If they are hydraulic actuators, then the control signals may illustratively control hydraulic valves (either electrically or hydraulically) to actuate the hydraulic actuators 174.

Stabilizer wheel depth control logic 168 also illustratively controls signal generator logic 169 to generate stabilizer actuator control signals based upon the identified corresponding position or depth of the stabilizer wheel depth control actuators 128, 130. This is indicated by block 198. Again, when the stabilizer wheel depth control actuators 128, 130 are electric actuators (such as electric motors) the control signals may be electric signals. When actuators 128, 130 are hydraulic actuators, then the control signals are illustratively provided to control hydraulic valves to move actuators 128, 130 so that stabilizer wheels 120, 122 assume the identified position relative to frame 106, corresponding to the main depth setting.

Depth sensors 172 can be provided to sense the position of actuators 174, 128, and 130, or to sense the position of the wheels 112, 120, 122 relative to frame 106 in a variety of ways. For instance, they may be rotary potentiometers, rotary Hall Effect sensors, etc. that sense the position of the mechanical linkages that movably connect wheels 112, 120, 122 to frame 106. They can be a wide variety of other sensors as well. They illustratively detect the position of wheels 112 and stabilizer wheels 120, 122 relative to frame 106. This is indicated by block 200. The control signal generator logic 169 determines whether the wheels are at the desired positions. If not, then it continues to generate the control signals to move the corresponding actuators so that the wheels are in the desired position relative to frame 106. This is indicated by block 202.

At block 204, if there have not been any adjustments yet to the main or stabilizer actuator position settings, then so long as the tillage operation is not finished (as indicated by block 206), then depth control system 160 simply continues to maintain the positions of the main depth control actuators 174 and stabilizer wheel depth control actuators 128, 130. This is indicated by block 208. When the main depth control actuators 174 and the stabilizer wheel depth control actuators 128, 130 have moved the corresponding wheels to the desired positions relative to frame 106, then the system 160 illustratively maintains the actuators, in that position, until a settings change is detected. For instance, it may be that operator 165 provides another input changing either the main depth setting or the stabilizer actuator position (or depth) of the stabilizer wheels. The change to the main depth setting or the stabilizer actuator position setting can also be received automatically, from a sensor input, or in other ways, as discussed above. If this is detected, as indicated by block 204, then it is determined whether the change is to a stabilizer actuator or a main depth control actuator. If it is to change the main depth setting (e.g., to change the position of the main depth control actuators 174), the processing reverts to block 188.

However, if the detected input is to change the position of a stabilizer wheel (or stabilizer wheel depth control actuator 128, 130) then processing may be performed in a number of different ways. For instance, it may be that actuators 128, 130 are independently controllable, independently of one another and of the main control actuators 174. If so, then stabilizer wheel depth control logic 168 uses signal generator logic 169 to generate signals to isolate the stabilizer actuators 128, 130 relative to one another (or relative to main depth control actuators 174) so they can be controlled in a desired way. This is indicated by block 210. Stabilizer wheel depth control logic 168 then uses signal generator logic 169 to generate the control signals so that they adjust the stabilizer wheel depth control actuators 128, 130 so that the stabilizer wheels are positioned relative to frame 108 in a desired position, as desired by operator 165, and based on the operator input. This is indicated by block 212 in the flow diagram of FIG. 4 (and one example is described in more detail below with respect to FIGS. 6 and 7).

When this happens, this means that operator 165 is changing the position of the stabilizer wheels 120, 122 relative to frame 108 from that which was defined by the depth control curve 163 (or otherwise defined as the stabilizer position that is correlated to the main depth setting). Therefore, in one example, correlation modification logic 171 illustratively adjusts the correlation between the main and stabilizer actuator positions based upon the user input that was used to adjust the stabilizer position at block 212. Adjusting the correlation is indicated by block 214.

By way of example, stabilizer wheel depth control logic 168 can change the control curve 163 to reflect the adjustment made by operator 165. When that happens, stabilizer wheel depth control logic 168 can illustratively continue to control the position of the stabilizer wheel depth control actuators 128, 130 (and hence the position of stabilizer wheels 120, 122 relative to frame 106) based upon the modified curve.

Figure 5:
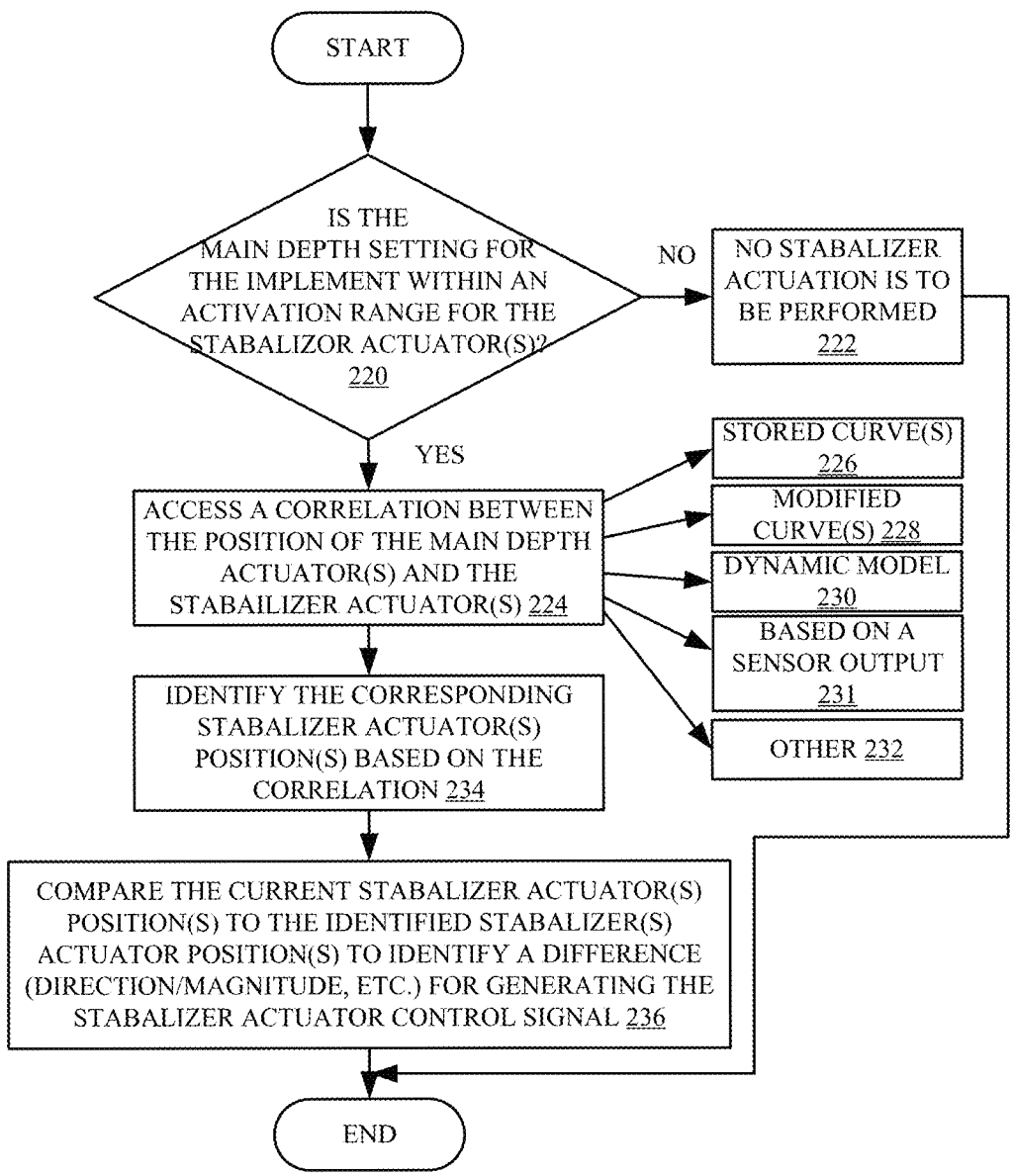
FIG. 5 is a flow diagram showing one example of the operation of the control system in identifying a position of a stabilizer depth control actuator based upon a detected main depth setting.

FIG. 5 is a flow diagram illustrating one example of the setting identifier logic 167 in identifying a stabilizer actuator position that corresponds to the main depth setting (as indicated at block 188 in FIG. 4) in more detail. In one example, it may be that operator 155 provides a change to the main depth control setting to lift the entire set of ground-engaging elements 108 of implement 102 out of the ground. This may be done for purposes of transport, for purposes of making a headland turn within a field being tilled, or for other reasons. In that case, then the position of the stabilizer wheel depth control actuators 128, 130 need not be changed, since their purpose is to level or otherwise reposition implement 128 while it is tilling. Therefore, in one example, stabilizer wheel depth control logic 168 is configured so that it will not change the position of the stabilizer wheel depth control actuators 128, 130 unless the operator is changing the main depth control setting to a position where the soil-engaging elements 108 are still engaging the soil. If the change to the main depth control setting is to lift the soil-engaging elements out of the soil, then the modification to the main depth control setting input by the operator moves the main depth control actuators 174 to a position which is outside the operating range where the stabilizer wheel depth control actuators 128, 130 will be utilized. Thus, in one example, stabilizer wheel depth control logic 168 first determines whether the main depth setting for the implement 102 is within an activation range for the stabilizer wheel depth control actuators 128, 130. Again, this may be a determination as to whether the main depth setting is set such that the ground-engaging elements 108 are completely out of the ground. If so, the main depth setting would be out of the activation range for the stabilizer actuators 128, 130 (e.g., they do not need to be moved). Determining whether the main depth setting for the implement is within the activation range for the stabilizer actuators 128, 130 is indicated by block 220 in FIG. 5. If it is not, then no stabilizer actuation is to be performed (i.e., the stabilizer wheel depth control actuators 128, 130 need not be changed). This is indicated by block 222.

However, if the main depth setting for implement 102 is within the activation range of the stabilizer wheel depth control actuators 128, 130 (e.g., if the main depth control setting is set so that the ground-engaging elements 108 are in engagement with the ground), then stabilizer wheel depth control logic 168 illustratively accesses an item that defines a correlation between the position of the main depth control actuators 174 and the stabilizer wheel depth control actuators 128, 130. This is indicated by block 224. In doing so, it can access the depth control curves 163, as indicated by block 226 in the flow diagram of FIG. 5. Curves 163 can be predetermined based on machine configuration (e.g., factory settings), they can be set by a user during a separate "leveling" procedure or based on user inputs on-the-fly, while tilling. It can access any modified curves (that have been modified based on a user adjustment to the stabilizer wheel depth control actuators). This is indicated by block 228. The item that defines the correlation between the position of the stabilizer wheels 120, 122 and the main wheels 112, relative to frame 106, can be a dynamic model that is a machine learned model or another model that receives, as an input the main depth setting and provides, as an output, the position of the stabilizer wheel depth control actuators 128, 130. Using a dynamic model is indicated by block 230 in the flow diagram of FIG. 5. The correlation between the positions of the different actuators can also be identified, based on a sensor output from a sensor on the implement 102, or elsewhere, that indicates the orientation of implement 102 (e.g., whether it is level). This is indicated by block 231. The item defining the correlation between the position of the main depth control actuators 174 and the stabilizer wheel depth control actuators 128, 130 can be a wide variety of other items as well, and this is indicated by block 232.

Once the item defining the correlation (e.g., the control curve 163) is accessed, then the corresponding stabilizer actuator position is identified (using that correlation). For instance, if the correlation is identified by a depth control curve 163, then once the main depth control setting is known, that curve can be accessed (as described in blocks 224 and 226) to identify the corresponding stabilizer actuator position, as indicated by block 234 in the flow diagram of FIG. 5. Because depth sensors 172 illustratively provide a signal indicative of the position of the stabilizer wheel depth control actuators 128, 130, then the current stabilizer actuator position is compared to the identify stabilizer actuator position to determine whether there is a difference (e.g., to determine whether the actuators 128, 130 need to be moved, and the direction and magnitude of that move). This determination is used by signal generator logic 169 to generate the stabilizer actuator control signals to actuate stabilizer wheel depth control actuators 128, 130. Comparing the current stabilizer actuator position to the position corresponding to the main depth control setting is indicated by block 236 in the flow diagram of FIG. 5. The signals can then be generated and processing can continue as at block 196 in FIG. 4 above.

Figure 6:
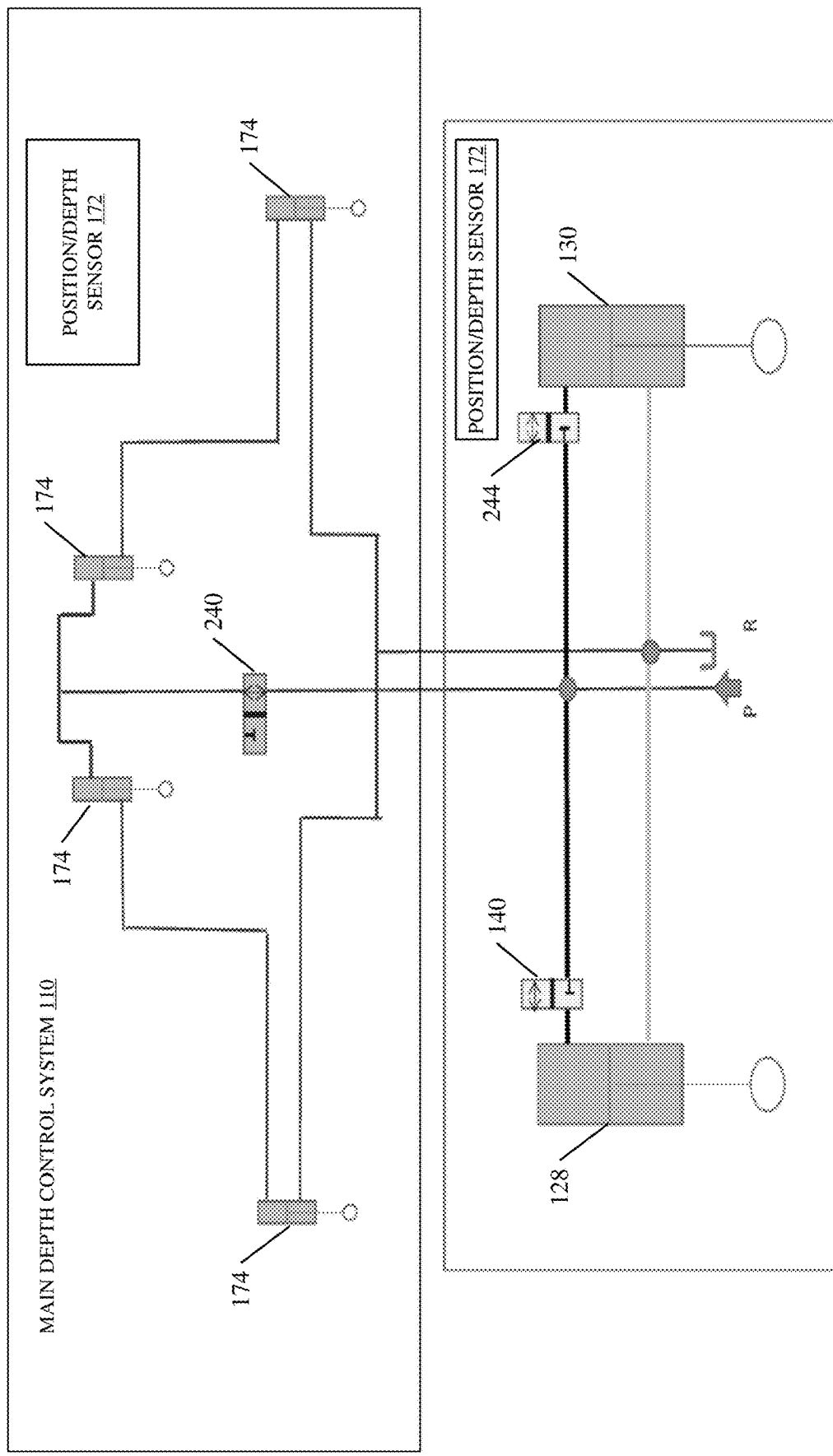
FIGS. 6 and 7 show examples of hydraulic circuits.

FIG. 6 is a partial block diagram, partial hydraulic schematic diagram, of main depth control system 110 and stabilizer actuators 128, 130. Main depth control system 110 illustratively includes a set of position or depth sensors 172, along with a set of main depth control actuators 174 that are coupled to move the linkages between the main frame 106 and the main weight bearing wheels 112 (illustrated in FIG. 1).

System 110 also illustratively includes control valve 240. When in the position illustrated in FIG. 6, control valve 240 can provide hydraulic fluid under pressure to the hydraulic cylinders 174 so that the extension of those cylinders is illustratively controlled. When it is moved into the opposite position of that shown in FIG. 6, then this will inhibit the flow of hydraulic fluid either into or out of the hydraulic cylinders 174, thus holding them in their current position.

Stabilizer wheel depth control actuators 128, 130 each illustratively have a corresponding control valve 140, 244. The valves are illustratively independently operable to move between the positions shown in FIG. 6 and the opposite positions. As shown in FIG. 6, the valve position of valves 140 and 244 inhibit the flow of hydraulic fluid into or out of actuators 128, 130, thus holding them in their current position. In order to independently control actuators 128, 130, stabilizer wheel depth control system 168 illustratively controls valve 240 to move it to the opposite position of that shown in FIG. 6 so that the stabilizer actuators 128 and 130 are isolated from the main depth control actuators 174. It then illustratively moves one of valves 140 and 244 (for the sake of the present description it will move valve 140 first) into the opposite position of that shown in FIG. 6. Thus, hydraulic fluid under pressure can be provided to actuator 128 to change its position independently of the other actuators shown in FIG. 6.

Once actuator 128 is in the desired position, control logic 168 can then use signal generator logic 169 to generate control signals to move valve 140 back to the position shown in FIG. 6, and to move valve 244 into the opposite position of that shown in FIG. 6. In this way, actuator 130 is isolated from the other hydraulic actuators in FIG. 6, and it can be independently controlled. Once it has been controlled to be in the desired position, valve 244 can again be moved to the position shown in FIG. 6, and valve 240 can be moved back to the position shown in FIG. 6 as well. In this way, the main depth setting can be changed by the operator, without also changing the position of actuators 128 and 130.

Figure 7:
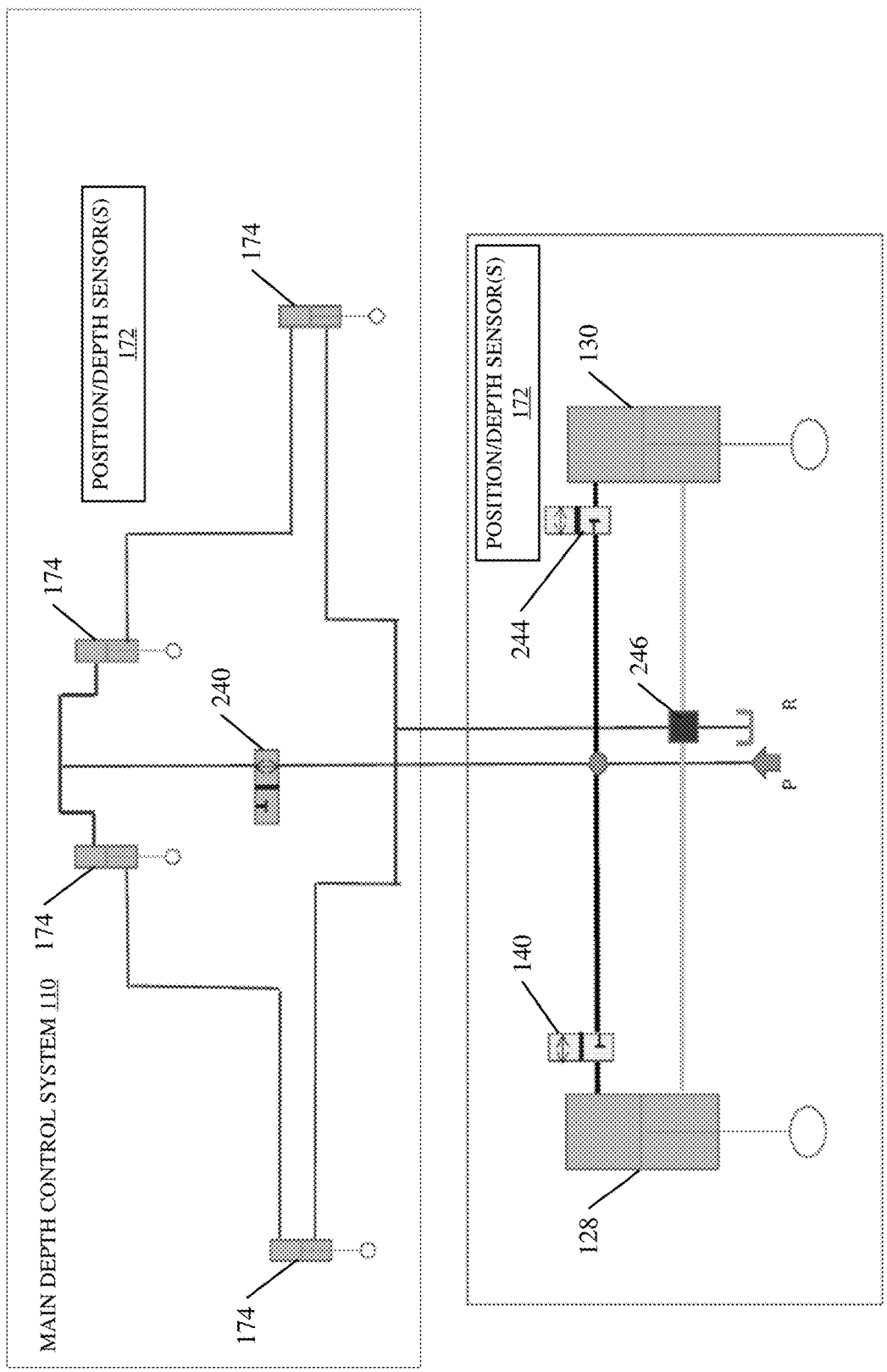

However, if the generator changes the main depth setting, then stabilizer wheel depth control logic 168 can automatically isolate and control actuators 128 and 130 to move them to their new corresponding positions as well. Further, operator 165 can use stabilizer wheel depth control logic 168 to generate control signals to independently control actuators 128 and 130 as well. It does so in the same was as described above, but based on an operator input. Thus, the isolation and independent control of the actuators 128 and 130 can be done either automatically by stabilizer wheel depth control logic 168, or manually by operator 165 using a suitable operator interface mechanism 162 to control the depth control system 160 to generate the proper control signals. FIG. 7 is similar to FIG. 6, and similar items are similarly numbered. However, it can be seen in FIG. 7 that an additional valve 246 is also provided. Therefore, instead of only introducing hydraulic fluid under pressure into the base end of the various hydraulic cylinders in FIG. 7, valve 246 can be controlled to controllably introduce hydraulic fluid under pressure into the rod end as well. Thus, the position of stabilizer wheels 120-122 can be controlled from inside the operator compartment of towing vehicle 100. Control system 160 can automatically actuate the stabilizer wheel depth control actuators 128, 130 corresponding to depth changes that are input from operator 165 to the main depth setting. Also, because actuators 128, 130 can be independently operated, the operator 165 can determine a preferred position for each of them, and that position will be automatically changed based on changes to the main depth setting input by operator 165. In one example, the changes will only be made to the stabilizer actuators when the main depth setting is set so that the soil-engaging elements 108 are engaging the soil. If they are raised out of the soil, stabilizer control need not be performed.

It will also be noted that actuators 128, 130 can be electrical actuators or hydraulic actuators. If they are hydraulic actuators, they can be on their own hydraulic circuit or they can be isolatable, but on the same hydraulic circuit as the main depth control actuators 174, as illustrated in FIGS. 6 and 7.

Further, it will be noted that the stabilizer wheel depth control actuators 128, 130 can be controlled based upon a sensed pressure (or weight carrying-force) setting. Operator 165 can set a given pressure for the actuator to hold. In that case, depth sensors 172 can be replaced or augmented with pressure sensors that sense the hydraulic cylinder pressure (or other actuator pressure) on actuators 128, 130. Stabilizer wheel depth control logic 168 will then use signal generator logic 160 to generate control signals to control the stabilizer wheel depth control actuators 128, 130, to maintain the desired pressure. When the main depth setting is changed, the pressure on actuators 128, 130 will correspondingly change so that control logic 168 can modify the position of actuators 128, 130, to maintain the desired pressure.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein. Also, the figures show a number of blocks with functionality ascribed to each block. It will be noted that fewer blocks can be used so the functionality is performed by fewer components. Also, more blocks can be used with the functionality distributed among more components.

Figure 8:
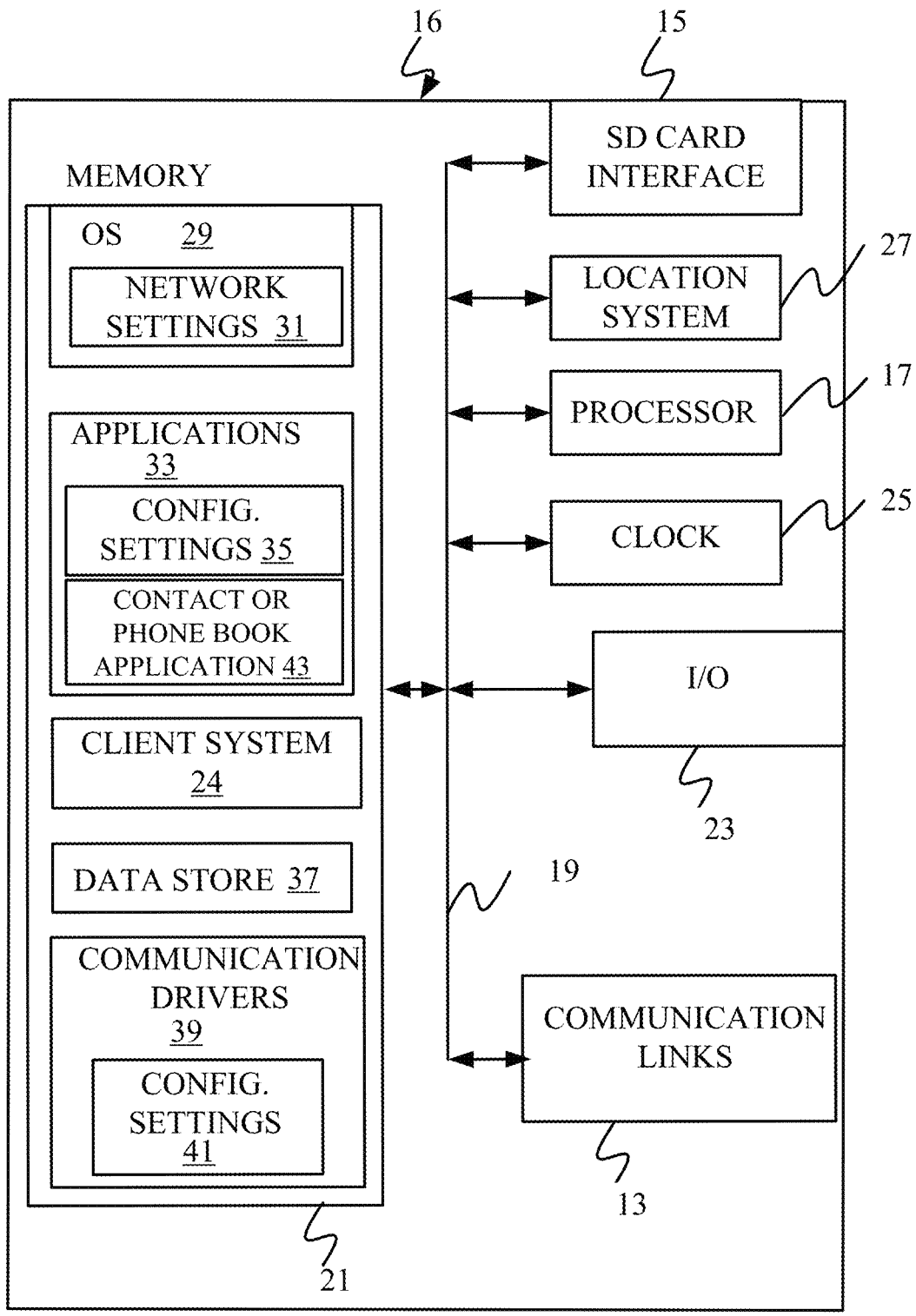
FIGS. 8-10 show examples of mobile devices that can be used to implement all or part of the depth control system.
Figure 9:
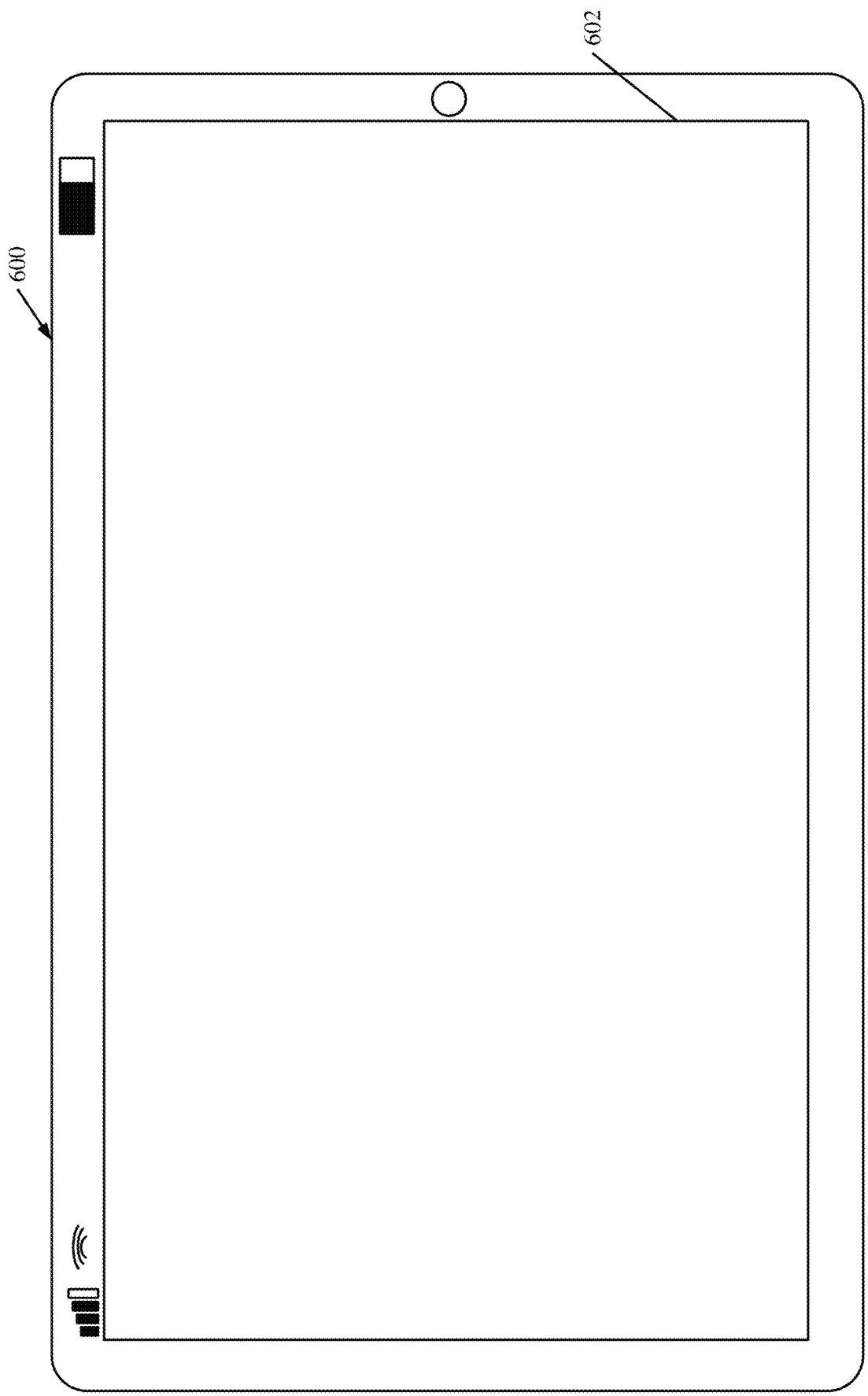
Figure 10:
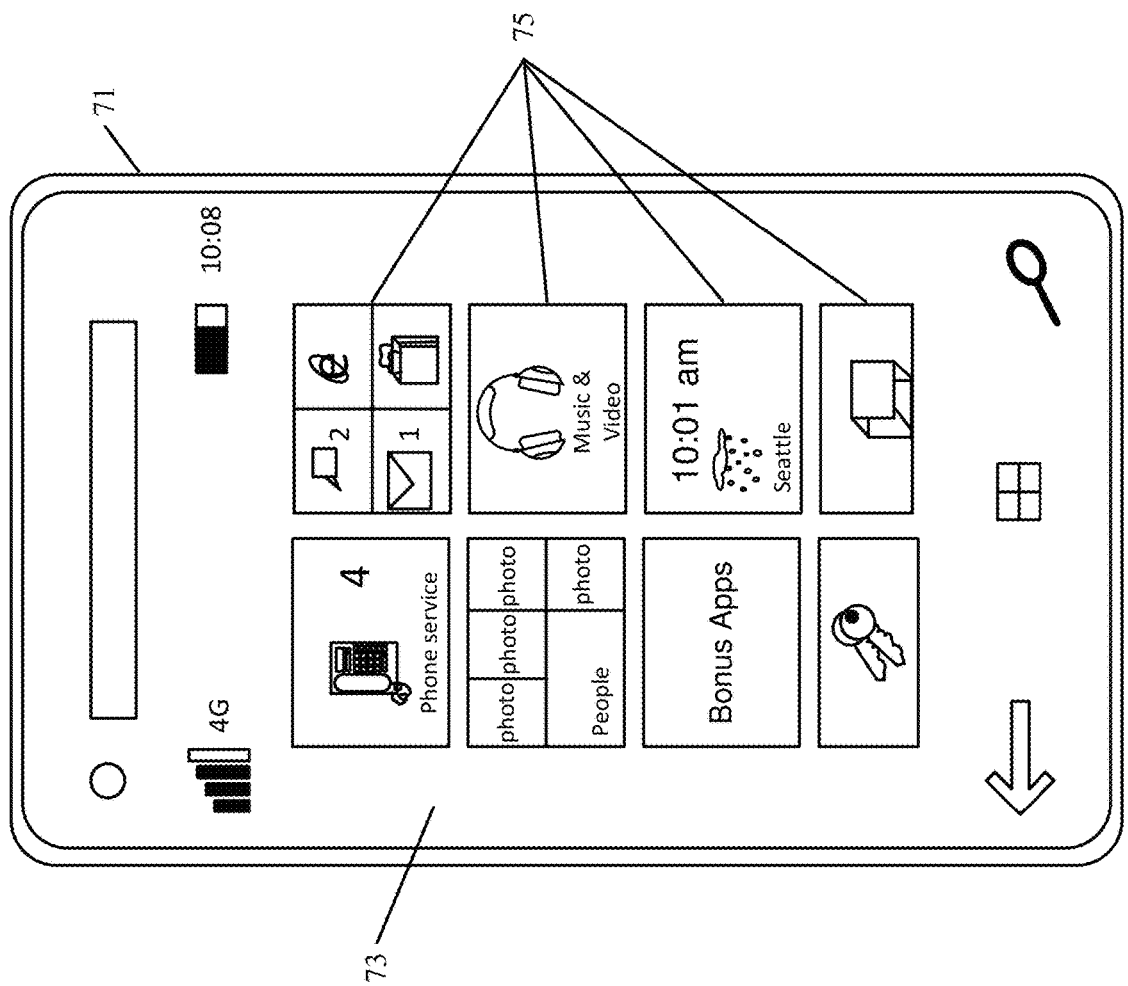

FIG. 8 is a simplified block diagram of one illustrative example of a handheld or mobile computing device that can be used as a user's or client's hand held device 16, in which the present system (or parts of it) can be deployed. For instance, a mobile device can be deployed in the operator compartment of towing vehicle 100 for use in controlling actuators, or generating, processing, or displaying data. FIGS. 9-10 are examples of handheld or mobile devices.

FIG. 8 provides a general block diagram of the components of a client device 16 that can run some components shown in FIG. 1, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors from previous FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 9 shows one example in which device 16 is a tablet computer 600. In FIG. 9, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 10 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 11:
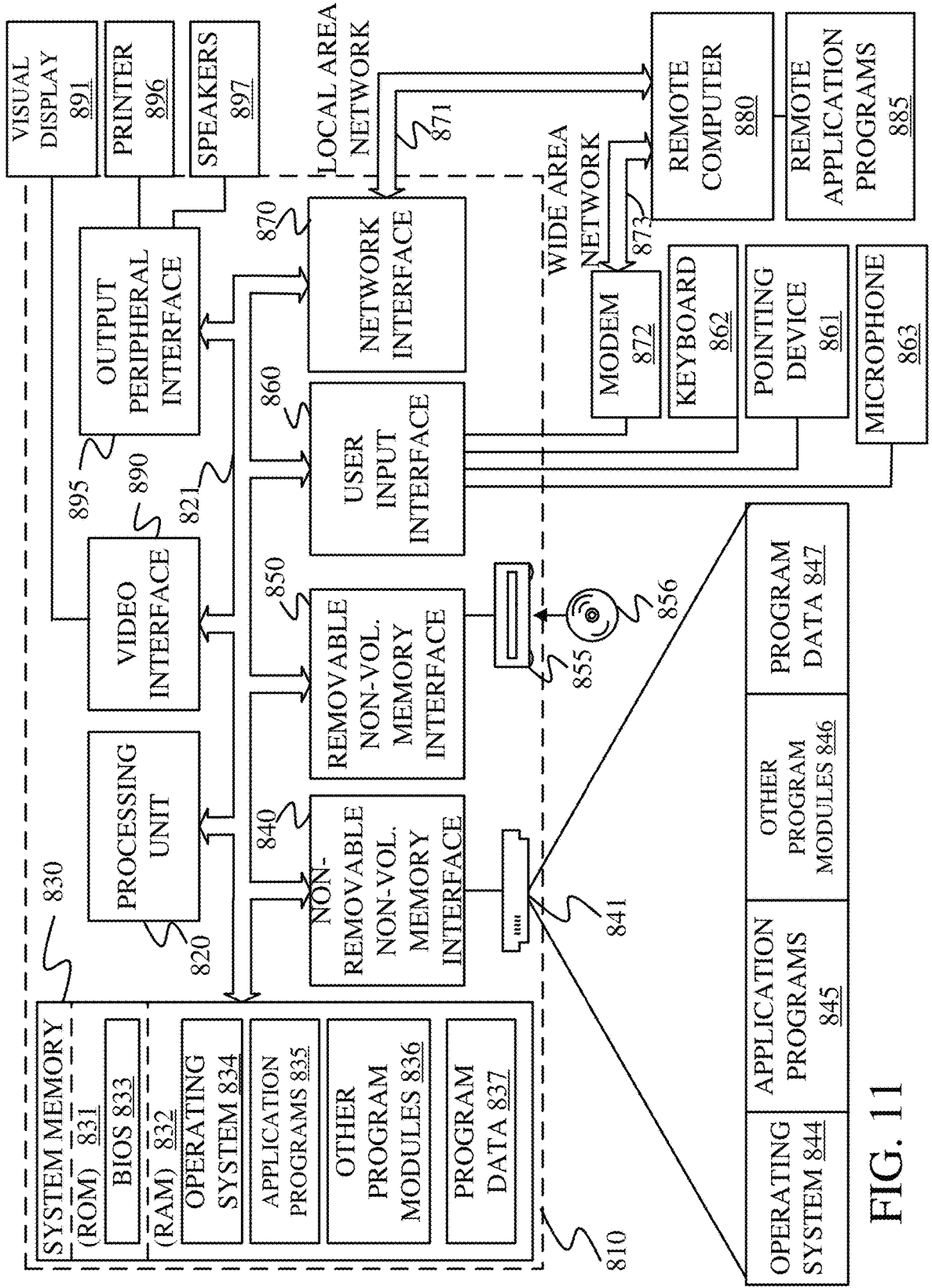
FIG. 11 is a block diagram showing one example of a computing environment that can be used to implement all or part of the depth control system.

FIG. 11 is one example of a computing environment in which elements of FIG. 3, or parts of it, (for example) can be deployed. With reference to FIG. 11, an example system for implementing some embodiments includes a general-purpose computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 3 can be deployed in corresponding portions of FIG. 11.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal. The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 11 illustrates operating system 834, application programs 835, other program modules 836, and program data 837.

The computer 810 may also include other removable/non-removable volatile/nonvolatile computer storage media. By way of example only, FIG. 11 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 810. In FIG. 11, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 11 illustrates, for example, that remote application programs 885 can reside on remote computer 880.

It should also be noted that the different embodiments described herein can be combined in different ways. That is, parts of one or more embodiments can be combined with parts of one or more other embodiments. All of this is contemplated herein.

Example 1 is a method of controlling a towed agricultural implement, comprising:
 receiving an input indicative of a main depth setting;
 automatically identifying a stabilizer setting, indicative of a position of a stabilizer wheel relative to a frame of the towed agricultural implement, corresponding to the main depth setting;
 generating a main depth control signal, to control a main depth actuator that sets a position of a set of main depth control system wheels relative to the frame, based on the main depth setting; and
 automatically generating a stabilizer control signal based on the identified stabilizer setting, to control a stabilizer actuator, independently of the main depth actuator, to set the position of the stabilizer wheel relative to the frame.

Example 2 is the method of any or all previous examples wherein identifying a stabilizer setting comprises:
 accessing a predefined correlation indicator, indicative of a predefined correlation between the position of the main depth control system wheels relative to the frame and the stabilizer wheel relative to the frame; and
 identifying the stabilizer setting based on the main depth setting and the predefined correlation indicator.

Example 3 is the method of any or all previous examples wherein identifying the stabilizer setting comprises:
 determining whether the main depth setting is within a range of activation in which the stabilizer setting is to be set; and
 if not, maintaining the stabilizer setting unchanged.

Example 4 is the method of any or all previous examples and further comprising:
 receiving a change input indicative of a change to the stabilizer setting; and
 modifying the predefined correlation indicator based on the change to the stabilizer setting.

Example 5 is the method of any or all previous examples and further comprising:
receiving a change input indicative of a change to the main depth setting;
automatically accessing the modified predefined correlation indicator; and
identifying a different stabilizer setting based on the changed main depth setting and the modified predefined correlation indicator.

Example 6 is the method of any or all previous examples and further comprising:
generating the main depth control signal, to control the main depth actuator, based on the changed main depth setting; and
automatically generating the stabilizer control signal based on the identified different stabilizer setting, to control the stabilizer actuator, independently of the main depth actuator, to set the position of the stabilizer wheel relative to the frame.

Example 7 is the method of any or all previous examples wherein accessing the predefined correlation indicator comprises:
accessing a predefined correlation curve that correlates the main depth setting to the stabilizer setting.

Example 8 is the method of any or all previous examples wherein accessing the predefined correlation indicator comprises:
accessing a sensor input or a dynamic model that correlates the main depth setting to the stabilizer setting.

Example 9 is the method of any or all previous examples wherein the main depth actuator and the stabilizer actuator are hydraulic actuators, and wherein automatically generating the stabilizer control signal comprises:
controlling a hydraulic valve to isolate the stabilizer actuator from the main depth setting actuator; and
controlling the stabilizer actuator based on the identified stabilizer setting to set the position of the stabilizer wheel relative to the frame.

Example 10 is the method of any or all previous examples wherein receiving an input indicative of the main depth setting comprises receiving the input as one of a position setting or a pressure setting and wherein identifying the stabilizer setting comprises identifying one of a position setting or a pressure setting.

Example 11 is a towed agricultural implement that travels over ground, comprising:
a frame;
a ground engaging element coupled to the frame;
a main depth control system that receives a main depth control signal from a towing vehicle and controls a position of the ground engaging element and the frame, relative to the ground, based on the main depth control signal;
a stabilizer wheel;
a movable stabilizer link that movably couples the stabilizer wheel to the frame; and
a stabilizer actuator, that is controllable independently of the main depth control system, that receives a stabilizer position control signal from the towing vehicle and moves the stabilizer link relative to the frame to change a position of the stabilizer wheel relative to the frame based on the stabilizer position control signal.

Example 12 is the towed agricultural vehicle of any or all previous examples and further comprising:
a position sensor configured to sense a sensed value indicative of a position of the stabilizer wheel relative to the frame and to generate a position signal indicative of the sensed value.

Example 13 is the towed agricultural vehicle of any or all previous examples wherein the stabilizer actuator comprises:
a stabilizer hydraulic cylinder; and
a control valve controlled by the stabilizer position control signal and configured to control flow of hydraulic fluid between the hydraulic cylinder and a hydraulic system.

Example 14 is the towed agricultural vehicle of any or all previous examples wherein the main depth control system comprises a main depth control hydraulic actuator, and further comprising:
an isolation valve that is controllable to isolate the stabilizer hydraulic cylinder from the main depth control hydraulic actuator so the stabilizer hydraulic cylinder is controllable independently relative to the main depth control hydraulic actuator.

Example 15 is the towed agricultural vehicle of any or all previous examples wherein the stabilizer actuator comprises:
an electric actuator.

Example 16 is a depth control system for controlling a towed agricultural implement, the depth control system comprising:
an interface mechanism receiving an input indicative of a main depth setting;
setting identifier logic that automatically identifies a stabilizer setting, indicative of a position of a stabilizer wheel relative to a frame of the towed agricultural implement, corresponding to the main depth setting;
signal generator logic;
main depth control logic that controls the signal generator logic to generate a main depth control signal, to control a main depth actuator that sets a position of a set of main depth control system wheels relative to the frame, based on the main depth setting; and
stabilizer wheel depth control logic that controls the signal generator logic to automatically generate a stabilizer control signal based on the identified stabilizer setting, to control a stabilizer actuator, independently of the main depth actuator, to set the position of the stabilizer wheel relative to the frame.

Example 17 is the depth control system of any or all previous examples wherein the setting identifier logic is configured to access a predefined correlation indicator, indicative of a predefined correlation between the position of the main depth control system wheels relative to the frame and the stabilizer wheel relative to the frame, and identify the stabilizer setting based on the main depth setting and the predefined correlation indicator.

Example 18 is the depth control system of any or all previous examples wherein the setting identifier logic is configured to identify the stabilizer setting by determining whether the main depth setting is within a range of activation in which the stabilizer setting is to be set, and if not, maintaining the stabilizer setting unchanged.

Example 19 is the depth control system of any or all previous examples wherein the input mechanism is configured to receive a change input indicative of a change to the stabilizer setting, and further comprising:
correlation modification logic configured to modify the predefined correlation indicator based on the change to the stabilizer setting.

Example 20 is the depth control system of any or all previous examples wherein the main depth actuator and the stabilizer actuator are hydraulic actuators, and wherein the stabilizer wheel depth control logic is configured to automatically generate the stabilizer control signal by controlling a hydraulic valve to isolate the stabilizer actuator from the main depth setting actuator, and controlling the stabilizer actuator based on the identified stabilizer setting to set the position of the stabilizer wheel relative to the frame.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of controlling a towed agricultural implement, comprising:
   receiving an input indicative of a main depth setting indicative of a position of main depth control system wheels;
   generating a main depth control signal based on the main depth setting, to control a set of main depth actuators that each actuate a corresponding main depth control system wheel to the position relative to the frame indicated by the main depth setting;
   accessing, based on the main depth setting, a predefined correlation indicator, indicative of a predefined correlation between the position of the main depth control system wheels relative to the frame, indicated by the main depth setting, and a position of a stabilizer wheel relative to the frame;
   identifying a stabilizer setting, indicative of the position of the stabilizer wheel relative to the frame, based on the predefined correlation indicator;
   actuating an isolation valve to a closed position in which the set of main depth actuators are fluidically isolated from a stabilizer actuator that actuates the stabilizer wheel;
   automatically generating a first stabilizer control signal based on the identified stabilizer setting, to control the stabilizer actuator, independently of the main depth actuators, to actuate the stabilizer wheel to the position of the stabilizer wheel relative to the frame indicated by the identified stabilizer setting;
   receiving a change input indicative of a change to the position of the stabilizer wheel relative to the frame;
   generating a second stabilizer control signal based on the change input to control the stabilizer actuator to actuate the stabilizer wheel; and
   modifying, based on the change input, the predefined correlation indicator to change the predefined correlation to a predefined correlation between the position of the main depth control system wheels relative to the frame, indicated by the main depth setting and the changed position of the stabilizer wheel relative to the frame indicated by the change input.

2. The method of claim 1 wherein identifying the stabilizer setting comprises:
   determining whether the main depth setting is within a range of activation in which the stabilizer setting is to be set; and
   if not, maintaining the stabilizer setting unchanged.

3. The method of claim 1 and further comprising:
   receiving a change input indicative of a change to the main depth setting;
   automatically accessing the modified predefined correlation indicator; and
   identifying a different stabilizer setting based on the changed main depth setting and the modified predefined correlation indicator.

4. The method of claim 3 and further comprising:
   generating an additional main depth control signal, to control the main depth actuators, based on the changed main depth setting; and
   automatically generating a third stabilizer control signal based on the identified different stabilizer setting, to control the stabilizer actuator, independently of the main depth actuator, to set the position of the stabilizer wheel relative to the frame.

5. The method of claim 1 wherein accessing the predefined correlation indicator comprises:
   accessing a predefined correlation curve that correlates the main depth setting to the stabilizer setting.

6. The method of claim 1 wherein accessing the predefined correlation indicator comprises:
   accessing a dynamic sensor input or a model that correlates the main depth setting to the stabilizer setting.

7. The method of claim 1 wherein each main depth actuator is a hydraulic actuator and the stabilizer actuator is a hydraulic actuator.

8. The method of claim 1 wherein receiving the input indicative of the main depth setting comprises receiving the input as one of a position setting or a pressure setting and wherein identifying the stabilizer setting comprises identifying one of a position setting or a pressure setting.

9. An agricultural machine-towed agricultural-implement that travels over ground, comprising:
   an agricultural implement comprising:
      a frame;
      a plurality of main depth wheels coupled to the frame;
      a plurality of stabilizer wheels coupled to the frame;
      a fluid circuit;
      a plurality of main depth control actuators disposed on the fluid circuit, each main depth control actuator controllable to actuate a respective main depth wheel to a position relative to the frame based on a main depth control signal;
      a plurality of stabilizer actuators disposed on the fluid circuit, each stabilizer actuator controllable to actuate a respective stabilizer wheel to a position relative to the frame based on a stabilizer position control signal; and
      an isolation valve disposed on the fluid circuit downstream of the plurality of stabilizer actuators, the isolation valve actuatable between an opened position and a closed position in which the isolation valve fluidically isolates the plurality of main depth control actuators from the plurality of stabilizer actuators; and
   a control system configured to:
      receive an input indicative of a main depth setting:
      generate the main depth control signal based on the main depth setting:
      access a predefined correlation indicator, indicative of a predefined correlation between the main depth setting and a stabilizer setting:
      identify, based on the predefined correlation, the stabilizer setting:
      generate the stabilizer position control signal based on the stabilizer setting:

receive a change input indicative of a change to the position of at least one stabilizer wheel relative to the frame:

generate, based on the change input, a second stabilizer position control signal to control an at least one stabilizer actuator to change the position of the at least one stabilizer wheel relative to the frame; and modify, based on the change input, the predefined correlation indicator to change the predefined correlation to a predefined correlation between the main depth setting and a new stabilizer setting corresponding to the changed position of the at least one stabilizer wheel relative to the frame.

10. The agricultural machine of claim 9 wherein the agricultural implement further comprises;

a position sensor configured to sense a sensed value indicative of a position of a stabilizer wheel, of the plurality of stabilizer wheels, relative to the frame and to generate a position signal indicative of the sensed value.

11. The agricultural machine of claim 10 wherein each of the plurality of stabilizer actuators comprises a stabilizer hydraulic cylinder, and wherein the agricultural implement further comprises:

a plurality of stabilizer control valves, each stabilizer control valve, of the plurality of stabilizer control valves, configured to control flow of fluid between a respective stabilizer hydraulic cylinder and a fluid system.

12. The agricultural machine of claim 11 wherein the main depth control actuators are in fluidic communication with the stabilizer control valves when the isolation valve is in the opened position and wherein the main depth control actuators are fluidically isolated from the stabilizer control valves when the isolation valve is in the closed position.

13. The agricultural machine of claim 9 wherein the fluid circuit comprises a first hydraulic fluid circuit that is configured to introduce, hydraulic fluid into piston ends of the plurality of main depth control actuators and piston ends of the plurality of stabilizer actuators, and wherein the agricultural implement further comprises:

a second hydraulic fluid circuit that is configured to introduce hydraulic fluid into rod ends of the plurality of main depth control actuators and rod ends of the plurality of stabilizer actuators; and a second circuit control valve, disposed on the second hydraulic fluid circuit, that is controllable to control a flow of the hydraulic fluid that is introduced to the rod ends of the plurality of main depth control actuators and the rod ends of the plurality of stabilizer actuators.

14. The agricultural machine of claim 9, wherein the plurality of main depth control actuators comprises a first main depth control actuator, a second main depth control actuator, a third main depth control actuator, and a fourth main depth control actuator, and wherein the first and second main depth control actuators are in parallel, the first and third main depth control actuators are in series, and the second and fourth main depth control actuators are in series;

wherein the plurality of stabilizer actuators comprises a first stabilizer actuator and a second stabilizer actuator, the towed agricultural implement further comprising:

a first stabilizer control valve configured to control a flow of fluid to the first stabilizer actuator; and a second stabilizer control valve configured to control a flow of fluid to the second stabilizer actuator.

15. A depth control system for controlling a towed agricultural implement, the depth control system comprising:

one or more processors; and a data store that stores computer executable instructions that, when executed by the one or more processors, configure the one processors to:

receive an input indicative of a main depth setting;

generate a main depth control signal, to control a hydraulic main depth actuator, disposed on a hydraulic circuit, to set a position of a main depth control system wheel relative to the frame, based on the main depth setting;

determine whether the main depth setting will take ground engaging elements of the towed agricultural implement out of contact with the ground;

identify a stabilizer setting, indicative of a position of a stabilizer wheel relative to the frame of the towed agricultural implement, based on the main depth setting and based on the determination;

generate an isolation signal to control an isolation valve, disposed on the hydraulic circuit, to actuate to a closed position in which a hydraulic stabilizer actuator, disposed on the hydraulic circuit, is fluidically isolated from the hydraulic main depth actuator;

generate a stabilizer control valve signal to control a stabilizer control valve, disposed on the hydraulic circuit, to actuate to an opened position in which hydraulic fluid can flow to the hydraulic stabilizer actuator; and generate a stabilizer control signal based on the identified stabilizer setting, to control the hydraulic stabilizer actuator independently of the main depth actuator, to set the position of the stabilizer wheel relative to the frame.

16. The depth control system of claim 15 wherein the computer executable instructions, when executed by the one or more processors, further configure the one or more processors to:

access a predefined correlation indicator, indicative of a predefined correlation between the position of the main depth control system wheels relative to the frame and the stabilizer wheel relative to the frame; and identify the stabilizer setting based on the main depth setting and the predefined correlation indicator.

17. The depth control system of claim 16 wherein the computer executable instructions, when executed by the one or more processors, further configure the one or more processors to:

receive a change input indicative of a change to the stabilizer setting; and modify the predefined correlation indicator based on the change to the stabilizer setting.

18. The depth control system of claim 15, wherein the computer executable instructions, when executed by the one or more processors, further configure the one or more processors to:

receive an input indicative of a set weight carrying force for the stabilizer actuator to maintain;

calculate a pressure of fluid corresponding to the stabilizer actuator to provide the set, weight carrying force;

identify a current pressure of fluid corresponding to the stabilizer actuator;

compare the identified current pressure to the calculated pressure for providing the set weight carrying force;

identify the stabilizer setting based on the comparison;

automatically generating the stabilizer control signal based on the identified stabilizer setting, to control the stabilizer actuator, independently of the main depth actuator, to set the position of the stabilizer wheel relative to the frame to move the current pressure to the calculated pressure.

\* \* \* \* \*